March 18, 1952　　　H. C. SLECHTA　　　2,589,741
ELEMENTS PER UNIT LENGTH COUNTER MECHANISM
Filed April 13, 1950　　　　　　　　　　　　　5 Sheets-Sheet 1

INVENTOR
H.C.SLECHTA
BY
W.C.Parnell
ATTORNEY

March 18, 1952   H. C. SLECHTA   2,589,741
ELEMENTS PER UNIT LENGTH COUNTER MECHANISM
Filed April 13, 1950   5 Sheets-Sheet 3

INVENTOR
H.C.SLECHTA
BY
ATTORNEY

March 18, 1952 H. C. SLECHTA 2,589,741
ELEMENTS PER UNIT LENGTH COUNTER MECHANISM
Filed April 13, 1950 5 Sheets-Sheet 4
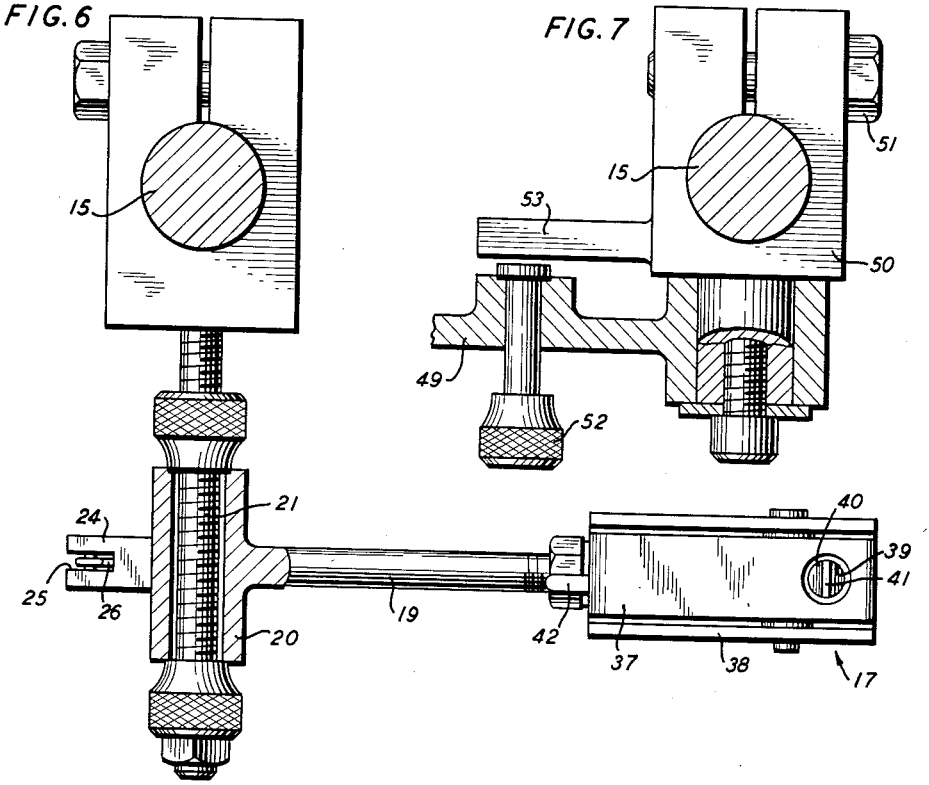
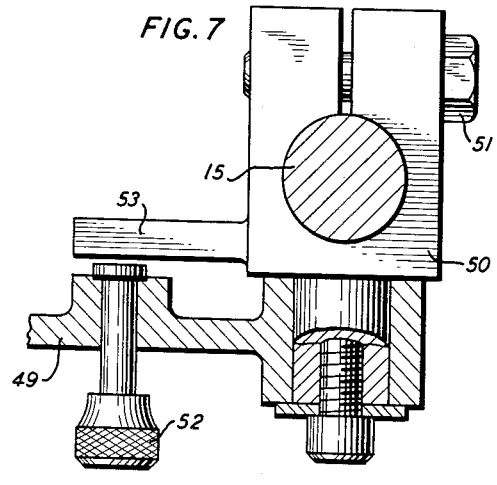
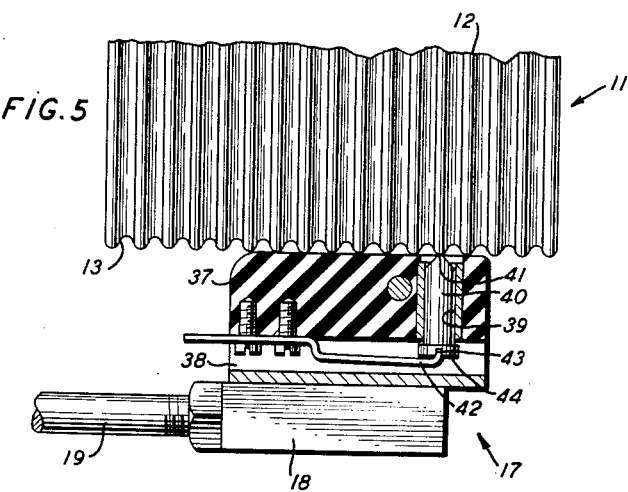
INVENTOR
H.C. SLECHTA
BY
ATTORNEY March 18, 1952    H. C. SLECHTA    2,589,741
ELEMENTS PER UNIT LENGTH COUNTER MECHANISM
Filed April 13, 1950    5 Sheets-Sheet 5

INVENTOR
H.C.SLECHTA
BY
ATTORNEY

Patented Mar. 18, 1952

2,589,741

UNITED STATES PATENT OFFICE 2,589,741

ELEMENTS PER UNIT LENGTH COUNTER MECHANISM

Henry C. Slechta, Plainfield, N. J., assignor to Western Electric Company, Incorporated, New York, N. Y., a corporation of New York Application April 13, 1950, Serial No. 155,581

6 Claims. (Cl. 235—92)

1

This invention relates to indicating mechanisms and more particularly to a device for counting the number of corrugations per unit length in corrugated material such as cable sheathing.

In the installation and other handling of metallically sheathed cables, it is often necessary to bend the cable in order to place it in a desired position. If the metallic sheathing of the cable were of the flat type, it would be difficult, if not impossible, to bend the larger sizes of cable sufficiently to accomplish this purpose. The metal strips from which the sheathing is formed are therefore usually required to be corrugated before the strip is formed about the cable in order to render the completed cable flexible enough for installation and handling purposes. Specifications for such cable therefore call for a minimum number of corrugations per unit length.

Because of the unpredictable stretching which occurs in the sheath during the manufacture of cable, any measurements made before this strip is formed about the cable core are unreliable, and it is therefore necessary to check the corrugations per unit length of cable while it is undergoing manufacture in order to determine if the required limits have been met. One conventional method of making this check has been to use a plurality of templates each having a row of saw teeth on one edge corresponding to the valleys of the corrugations. The corrugation count is determined by checking a sample length of cable with the various templates, which may range from 9.0 to 10.0 teeth per inch, until a match is found. This method inherently tends to be inaccurate and becomes extremely difficult to use at high cable manufacturing speeds.

It is therefore an object of this invention to determine quickly and accurately the number of corrugations per unit length of corrugated material. An important feature of the invention is a combination of devices which operates cyclically and entirely automatically to indicate the total number of corrugations in unit lengths of advancing material.

Applicant accomplishes his object, according to one embodiment of the invention, by pressing a pickup unit against a cable sheath or other corrugated material and causing each passing corrugation to provide an impulse from the pickup unit to a conventional electronic counter through a connecting circuit. A commutator also driven by the advancing sheath is connected into the pulsing circuit and allows the impulses to reach the counter during a fixed part of its rotation, with the corrugation count being indicated during the remainder of the commutator rotation.

2

Other objects and advantages will be apparent from the following detailed description taken in conjunction with the attached drawings in which:

Fig. 5 is a partial sectional view showing how the pickup contact is actuated by the passing corrugations;

Fig. 6 is a top plan view of the pickup unit and its support;

Fig. 7 is a sectional view of the support for the commutator wheel; taken along the line 7—7 of Fig. 2;

Figure 1:
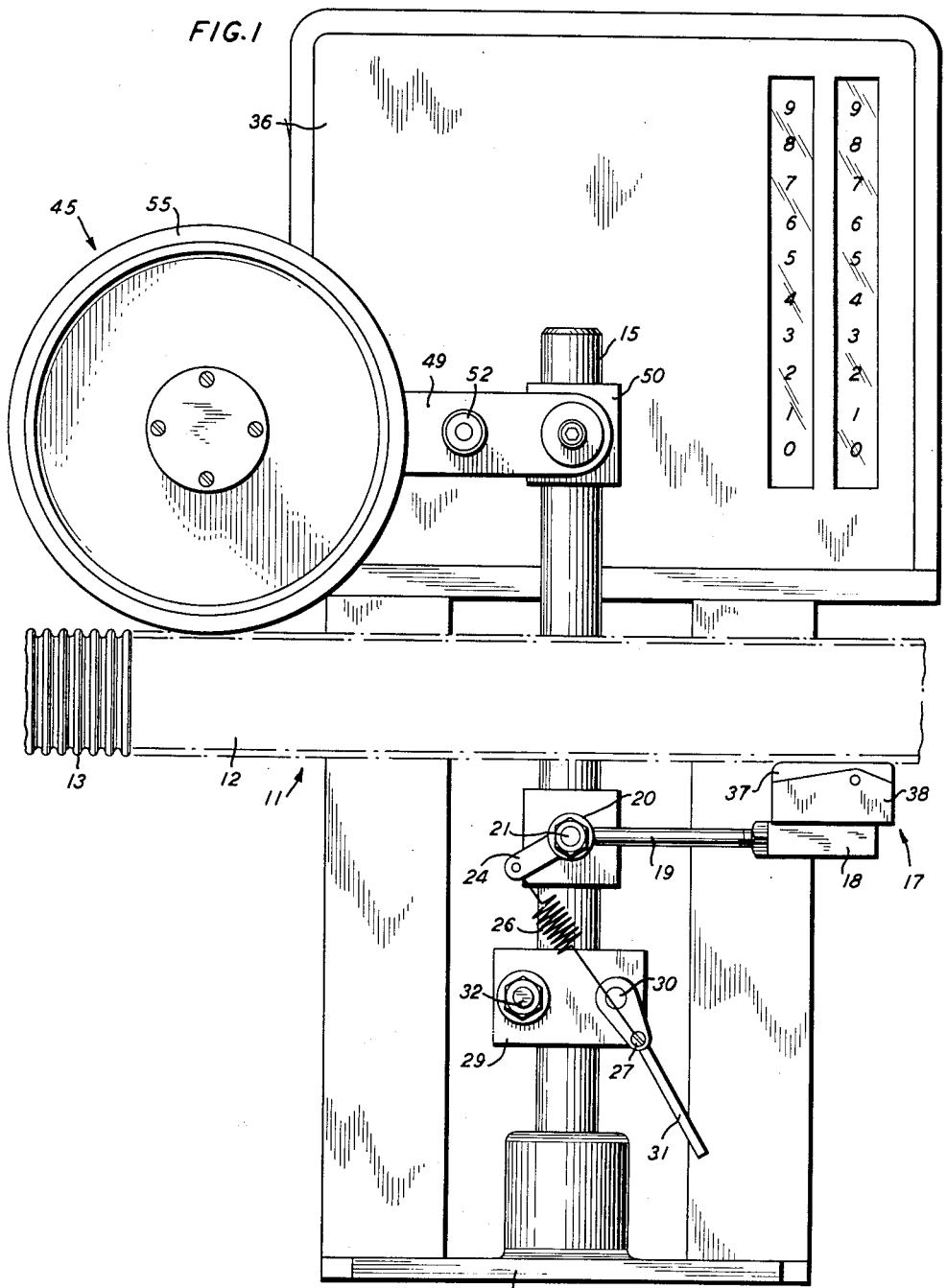
Fig. 1 is a front elevational view of the counting mechanism.

With reference to the drawings, Fig. 1 shows a cable 11 undergoing manufacture. As here shown, the cable has had formed about it a metallic sheathing 12, the sheathing being corrugated as at 13.

A base 14 having mounted therein an upright shaft 15 is used for supporting the corrugation counting apparatus. This apparatus includes a pickup generally designated as 17 which is used to receive impulses corresponding to the corrugations on the cable sheathing. This pickup unit is mounted on a flat portion 18 of an arm 19, the arm being integral with a hub 20 pivotally mounted on a shaft 21.

Figure 2:
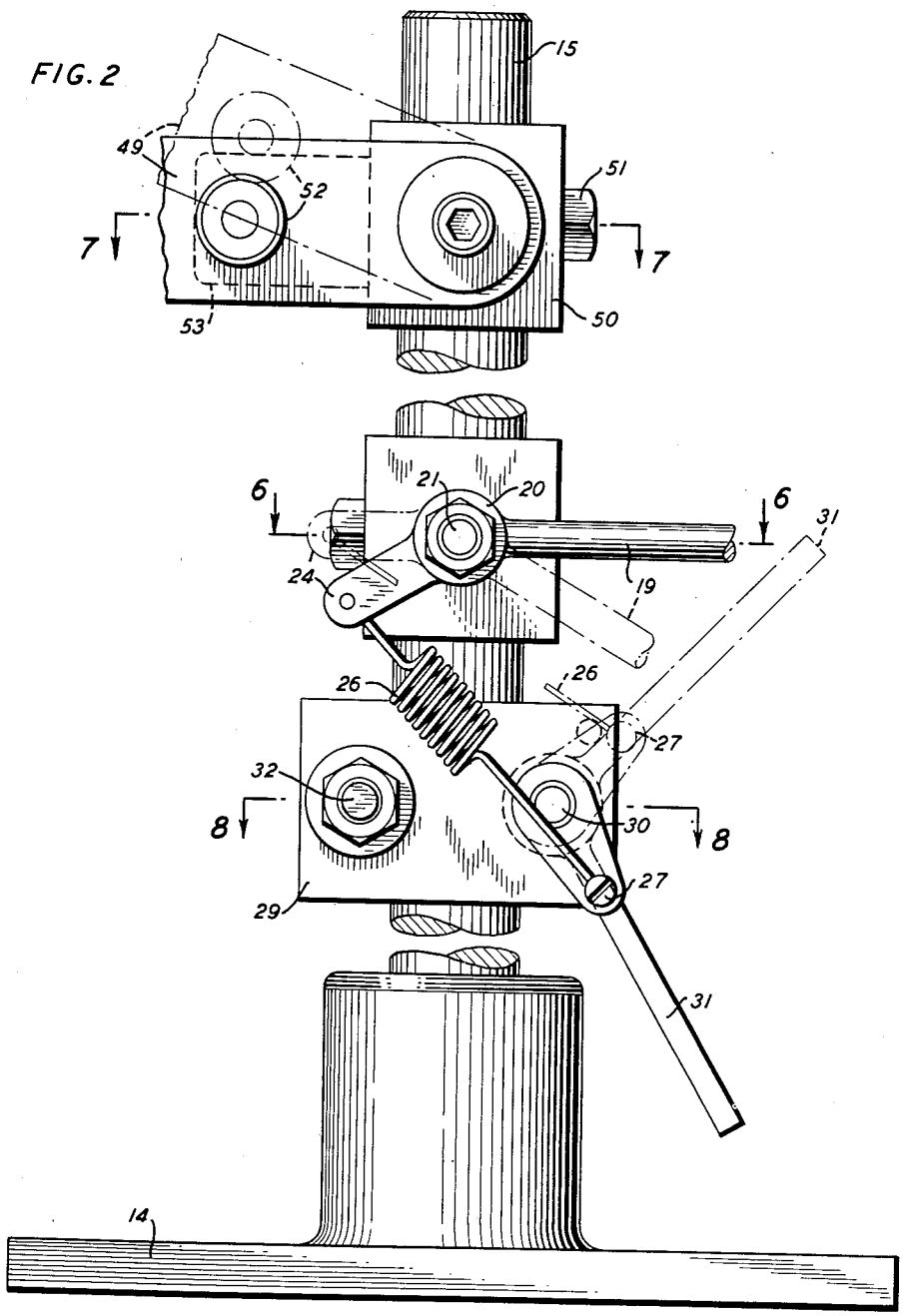
Fig. 2 is an enlarged view of the support for the pickup unit.

The arm 19 has an extension 24 formed at an angle thereto as shown in Fig. 2. This extension 24 has an opening 25 in its end into which is fastened one end of a spring 26. The other end of the spring is held in place by a screw 27 positioned near the end of an extension 28 of a slidable support member 29. The screw 27 is mounted at one end of a shaft 30 at the other end of which is rigidly mounted a handle 31.

With reference to Figs. 1 and 2, it will be seen that by moving the handle 31 in a downward direction, the spring 26 will be placed under tension and the resultant pull against extension 24 will cause the arm 19 to force the pickup unit 17 in close contact with the underside of the cable 11. When the handle 31 is returned to its upward position, the tension on the spring 26 is released, and the weight of the pickup unit 17 and the arm 19 will return the unit to its normal position out of contact with the cable sheath.

Figure 8:
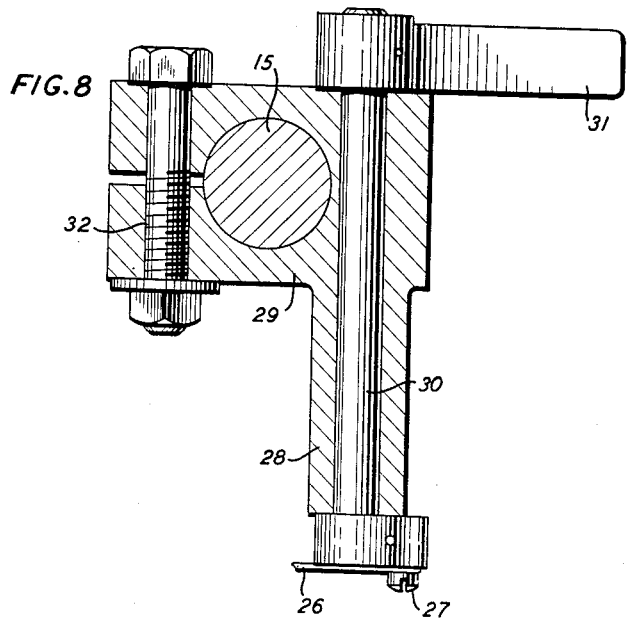
Fig. 8 is a sectional view of the positioning linkage for the pickup unit, taken along the line 8—8 of Fig. 2.

With reference to Fig. 8, the slidable support 29 is given a split construction to enable it to be moved up and down on the shaft 15 to vary the tension which is placed on the spring 26. A bolt 32 is used to hold this support 29 in any desired position.

Figure 9:
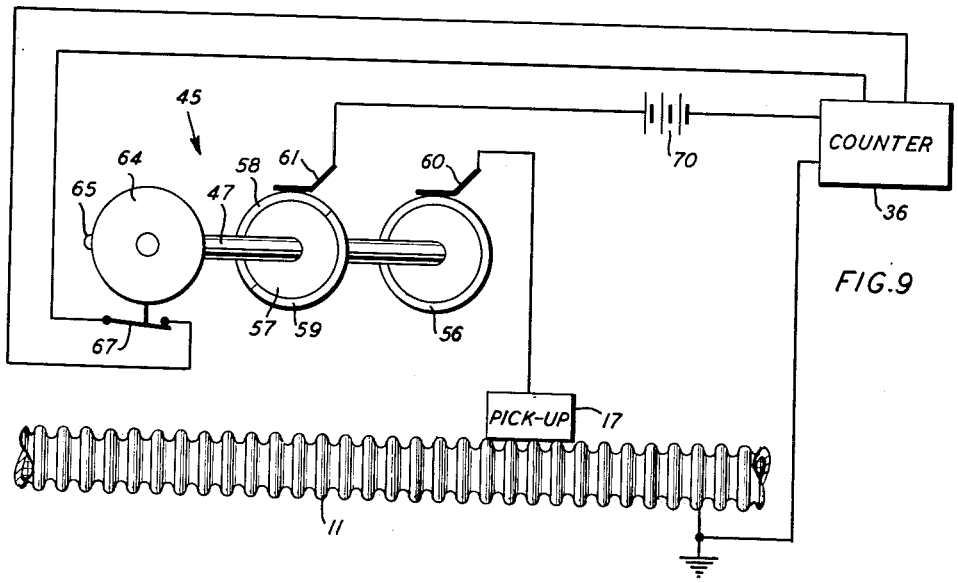
Fig. 9 is a schematic wiring diagram of the invention.

The passing corrugations of the cable sheath coact with the pickup unit 17 to create electrical impulses which pass through the pulsing circuit shown in Fig. 9 to an electronic counter 36. The manner in which these impulses are created is shown in Fig. 5. With reference to this figure, it will be seen that the pickup unit 17 comprises a main body 37 pivotally mounted in a U-shaped member 38, said body having a transverse bore 39. A pin 40 having a sharp V-shaped edge 41 is positioned in the transverse bore 39 with its edge at the top. A spring contact 42 which is suitably fastened to the bottom of the main body 37 exerts upward pressure against a slot 43 in the head of the pin 40 to force the edge 41 upwardly against the ridges of the passing corrugations. The contact spring 42 has its left end extending from the pickup unit to enable a lead to be soldered thereto to connect it to the pulsing circuit.

The pin 40 is chosen of such length that the spring pressure of contact 42 in conjunction with the stop 44 will cause its edge 41 to make contact with the ridges of the passing corrugations but not with the corresponding valleys. The pin edge 41 therefore makes intermittent contact with the passing corrugations, which creates a series of electrical impulses in the circuit shown in Fig. 9 corresponding in number to the number of ridges in the corrugated sheath. The edge 41 is shaped to insure that there will be an interruption of its contact with the sheath, and to make sure that there is no bridging effect between successive ridges. Any interruption in the contact between the edge and the corrugations is sufficient, no matter how slight.

Figure 3:
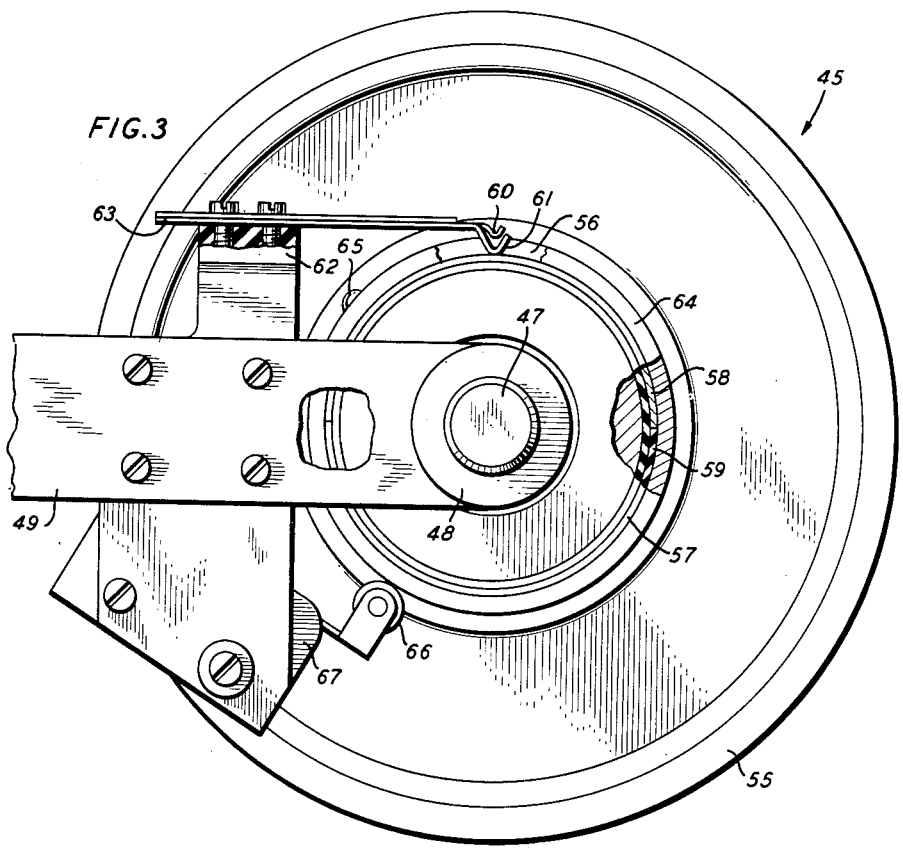
Fig. 3 is a back elevational view of the commutator assembly.
Figure 4:
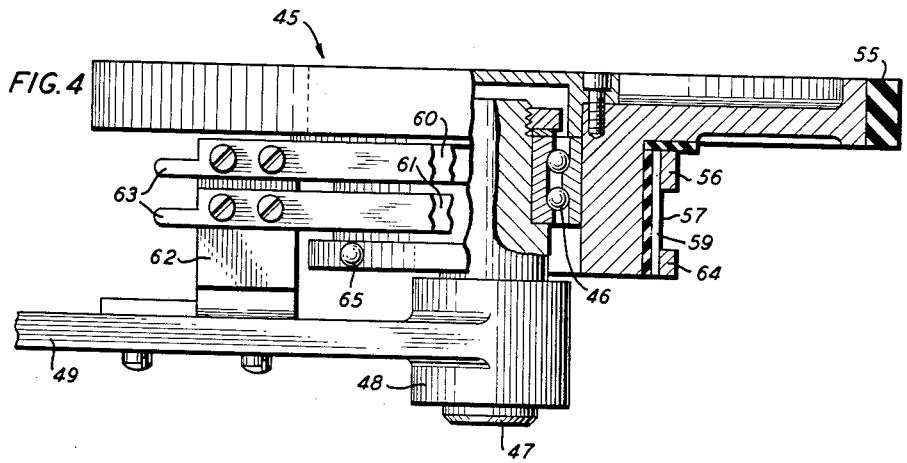
Fig. 4 is a top plan view, partially in section, of the commutator assembly.

Also connected in the pulsing circuit is a commutator 45. As shown in Figs. 3 and 4, this commutator is rotatably mounted through bearings 46 on a shaft 47 rigid with the hub 48 of a bracket 49. The bracket 49 is in turn pivotally mounted on a support 50 made adjustable in position on the shaft 15 by its split construction in conjunction with a holding bolt 51. A handle 52 is slidably positioned in the bracket 49 for raising and lowering the commutator assembly, and may be moved over the top of a projection 53 of the support 50 to hold the commutator in an upward position.

The outer surface 55 of the commutator is lined with rubber or other frictional material, and is positioned to rest on the top surface of the passing cable sheath so that the movement of the cable also rotates the commutator. The weight of the commutator assembly is sufficient to insure a positive and accurate driving connection free of slippage. The outer circumference of the surface 55 is made exactly 20" long for a purpose hereafter explained.

The commutator also has two collector rings 56 and 57, which are insulated as shown from the main body of the commutator. Collector ring 56 is made of a conducting material such as copper. One half 58 of the periphery of collector ring 57 is made of a conducting material, while the other half 59 is composed of an insulating material, with the result that the collector ring 57 will pass current on only one half of its surface. The two collector rings 56 and 57 are electrically connected to each other with the exception of the insulated portion of the ring 57.

Two copper brushes 60 and 61 maintain a sliding contact with collector rings 56 and 57 respectively. These brushes are suitably affixed to and insulated from a block 62 mounted on the bracket 49. Each brush has an integral strip portion 63 to which are soldered leads for connecting the two collector rings in series in the pulsing circuit.

An inner ring 64 of the commutator carries a projection 65 which makes contact with a roller 66 once during each revolution of the ring 64, depressing the roller and opening a contact in the microswitch 67. The microswitch 67 is connected in a reset circuit for the electronic counter.

With regard to the operation of the counting apparatus, the entire mechanism is first moved into position adjacent the cable undergoing manufacture. After the apparatus has been aligned, the pickup unit 17 is moved by the rod 31 until its upper surface is flush against the bottom of the advancing cable sheath, with the pin edge 41 in contact with successive corrugation ridges. The commutator 45 is next placed in position so that its rubber lined surface 55 rests on the top surface of the advancing cable, with resultant frictional contact rotating the commutator at a speed corresponding to the speed of the advancing cable.

The cable sheath is grounded, which means that the pulsing circuit will close momentarily as each corrugation ridge passes over the pickup and makes contact with the pin edge 41 to complete the circuit to the ground. Since the collector ring 57 conducts only for one half of its rotation, and the two collector rings are in series in the pulsing circuit, the impulses obtained from the pickup unit are transmited to the electronic counter for only one half of each revolution of the commutator. And since the bearing surface 55 of the commutator is designed to be exactly 20 inches in circumference, this means that the counter, which is of the totalizing type, will add impulses for only 10 inches of wheel rotation. For the remaining 10 inches of commutator travel, the count total for the previous 10 inches appears stationary on the counter, thus providing ample time for observation. The projection 65 is positioned to open the microswitch 67 near the end of this observation part of the travel, thus clearing the figures from the counter decades and resetting the counter mechanism to zero in preparation for the next counting period.

By means of the mechanism herein described, a count is obtained for every alternate 10 inches of cable length, and the proposed apparatus enables this count to be made during the manufacturing process at high cable speeds.

Fig. 9 is a schematic diagram of the pulsing and reset circuits, with potential for the former being supplied through a battery 70.

The electronic counter may be of any standard commercial type, and its design is not a part of the invention. Two counting decades are used in the embodiment here shown, to provide a count in tens and units. Where desired, a peaking type amplifier may be incorporated into the counter circuit for shaping the wave form of the impulse obtained from the pickup unit to a form more easily translated by the electronic counter.

Although a mechanical device has been shown for picking up impulses from the passing corrugations, the invention is not to be understood as limited to such means. The need is for suitable means for causing the passing corrugations to interrupt a pulsing circuit, and it is obvious that other mechanical or electrical means, such as photoelectric cell circuit, may be used for this purpose. Furthermore, while the invention is adapted primarily for use with moving corrugated sheaths or strips, it will be apparent that stationary material as well may be checked by moving the wheel and pickup unit together along the material.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a mechanism for counting the corrugations of a transversely corrugated longitudinally moving member, the combination with an electric pulse totalizing counter and an actuating circuit for the counter, of a fixed pickup unit having a contact connected in the circuit which is operated by each passing corrugation to transmit a pulse to the counter, a fixed measuring wheel in rolling contact with the member, means controlled by the wheel for interrupting the circuit during a portion of each revolution of the wheel, a reset circuit for the counter, and means associated with the wheel for actuating the reset circuit during the interruption period.

2. In a mechanism for counting the corrugations per unit length of a transversely corrugated longitudinally moving member, the combination with an electric pulse totalizing counter and an actuating circuit for the counter, of a fixed pickup unit having a contact connected in the circuit which is operated by each passing corrugation to transmit a pulse to the counter, a fixed measuring wheel in rolling contact with the member and an intermittently conducting commutator rigid with the wheel which is connected into the actuating circuit, the commutator closing said circuit during that portion of the peripheral travel of the wheel corresponding to the unit length and opening the circuit during the remainder of the wheel travel.

3. In a mechanism for counting the corrugations per unit length of a transversely corrugated longitudinally moving member, the combination with an electric pulse totalizing counter and an actuating circuit for the counter, of a fixed pickup unit having a contact connected in the circuit which is operated by each passing corrugation to transmit a pulse to the counter, a fixed measuring wheel in rolling contact with the member and an intermittently conducting commutator rigid with the wheel which is connected into the actuating circuit, the commutator closing said circuit during that portion of the peripheral travel of the wheel corresponding to the unit length and opening the circuit during the remainder of the wheel travel, a reset circuit for the counter, and means associated with the wheel for actuating the reset circuit near the end of the circuit opening period.

4. In a mechanism for counting the corrugations per unit length of a transversely corrugated longitudinally moving member, the combination with an electric pulse totalizing counter and an actuating circuit for the counter, of a fixed pickup unit having a contact connected in the circuit which is operated by each passing corrugation to transmit a pulse to the counter, means for holding the pickup unit against the moving member, a fixed measuring wheel in rolling contact with the member, a pair of collector rings coaxial and rigid with the wheel and electrically connected in series with the counter actuating circuit, one of said rings being continuously conducting while the other ring is partially conducting to close said circuit during that portion of the peripheral travel of the wheel corresponding to the unit length and partially insulated to open the circuit during the remainder of the wheel travel, a reset circuit for the counter, and means associated with the wheel for actuating the reset circuit near the end of the circuit opening period.

5. In a mechanism for counting the corrugations per unit length of a transversely corrugated sheath of a longitudinally moving member, the combination with an eltctronic pulse totalizing counter and an actuating circuit for the counter including a voltage source and the corrugated sheath, of a fixed pickup unit having a contact connected in the circuit, means for holding the pickup unit against the moving member, said contact having a V-shaped head positioned to engage the successive ridges of the passing corrugations and thereby create electrical impulses for the counter, a fixed measuring wheel in rolling contact with the member, and means controlled by the wheel for interrupting the circuit during a portion of each revolution of the wheel.

6. In a mechanism for counting the corrugations per unit length of a transversely corrugated sheath of a longitudinally moving member, the combination with an electronic pulse totalizing counter and an actuating circuit for the counter including a voltage source and the corrugated sheath, of a fixed pickup unit having a contact connected in the circuit, means for holding the pickup unit against the moving member, said contact having a V-shaped head positioned to engage the successive ridges of the passing corrugations and thereby create electrical impulses for the counter, a fixed measuring wheel in rolling contact with the member, a pair of collector rings coaxial and rigid with the wheel and electrically connected in series with the counter actuating circuit, one of said rings being continuously conducting while the other ring is partially conducting to close said circuit during that portion of the peripheral travel of the wheel corresponding to the unit length and partially insulating to open the circuit during the remainder of the wheel travel, a reset circuit for the counter, and means associated with the wheel for actuating the reset circuit near the end of the circuit opening period.

HENRY C. SLECHTA.

REFERENCES CITED

The following references are of record in the file of this patent:

UNITED STATES PATENTS

| Number | Name | Date |
| --- | --- | --- |
| 1,451,281 | Sundh et al. | Apr. 10, 1923 |
| 1,924,624 | Roesen | Aug. 29, 1933 |
| 2,122,710 | Bidwell et al. | July 5, 1938 |
| 2,415,854 | Sheffield | Feb. 18, 1947 |
| 2,543,790 | Maher et al. | Mar. 6, 1951 |

FOREIGN PATENTS

| Number | Country | Date |
| --- | --- | --- |
| 396,417 | Great Britain | July 24, 1933 |
| 424,917 | Germany | Feb. 8, 1926 |